(12) United States Patent
Katano et al.

(10) Patent No.: US 10,855,780 B2
(45) Date of Patent: Dec. 1, 2020

(54) APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Kiyoshi Katano, Chiba (JP); Takeshi Suzuki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 14/748,750

(22) Filed: Jun. 24, 2015

(65) Prior Publication Data

US 2016/0028795 A1 Jan. 28, 2016

(30) Foreign Application Priority Data

Jul. 23, 2014 (JP) .................. 2014-150132

(51) Int. Cl.
*G06F 15/16* (2006.01)
*H04L 29/08* (2006.01)
*G06Q 50/10* (2012.01)

(52) U.S. Cl.
CPC ............. *H04L 67/20* (2013.01); *G06Q 50/10* (2013.01); *H04L 67/12* (2013.01)

(58) Field of Classification Search
CPC .......... H04L 67/20; H04L 67/12; G06Q 50/10
USPC ............. 709/203, 224; 705/44, 67; 370/254; 713/155
See application file for complete search history.

(56) References Cited

U.S. PATENT DOCUMENTS

| 7,921,175 | B2 | 4/2011 | Noguchi | |
| 9,026,103 | B2* | 5/2015 | Tokumaru | H04W 12/06 455/420 |
| 9,537,888 | B1* | 1/2017 | McClintock | H04L 63/145 |
| 2001/0034774 | A1* | 10/2001 | Watanabe | H04M 3/5322 709/217 |
| 2003/0056096 | A1* | 3/2003 | Albert | G06F 21/31 713/168 |
| 2005/0003806 | A1* | 1/2005 | Bazin | G06Q 30/0241 455/414.2 |
| 2005/0052698 | A1* | 3/2005 | Hirabayashi | G06F 3/1222 358/1.15 |
| 2005/0108299 | A1* | 5/2005 | Nakajima | G06F 16/9574 |
| 2005/0177750 | A1* | 8/2005 | Gasparini | G06F 21/31 726/5 |
| 2005/0272434 | A1* | 12/2005 | Choi | H04B 1/715 455/450 |
| 2006/0100888 | A1* | 5/2006 | Kim | G06Q 20/3674 705/67 |
| 2006/0139685 | A1* | 6/2006 | Hayashi | G06F 21/608 358/1.15 |

(Continued)

FOREIGN PATENT DOCUMENTS

| JP | 2003241932 A | 8/2003 |
| JP | 2005-059303 A | 3/2005 |
| JP | 2005219440 A | 8/2005 |

OTHER PUBLICATIONS

Japanese Office Action issued in corresponding Japanese Office Action No. 2014150132 dated Mar. 2, 2018.

*Primary Examiner* — Thuong Nguyen
(74) *Attorney, Agent, or Firm* — Venable LLP

(57) ABSTRACT

In response to a request from an external device, information related to a server that provides a service related to an apparatus is set. The set information related to the server is transmitted.

24 Claims, 10 Drawing Sheets

(56) References Cited

U.S. PATENT DOCUMENTS

| | | | |
|---|---|---|---|
| 2006/0161658 A1 | 7/2006 | Noguchi | |
| 2007/0070401 A1* | 3/2007 | Okamoto | G06F 3/1222 358/1.15 |
| 2007/0124796 A1* | 5/2007 | Wittkotter | H04N 7/17309 725/136 |
| 2008/0189363 A1* | 8/2008 | Tian | H04L 67/1095 709/203 |
| 2008/0313724 A1* | 12/2008 | Doddapaneni | H04L 49/357 726/9 |
| 2009/0080013 A1* | 3/2009 | Sato | H04N 1/00204 358/1.15 |
| 2009/0193073 A1* | 7/2009 | Daimon | H04L 69/329 709/203 |
| 2009/0210400 A1* | 8/2009 | Castro | G06F 16/9535 |
| 2009/0228357 A1* | 9/2009 | Turakhia | G06F 17/30867 705/14.53 |
| 2010/0131593 A1* | 5/2010 | Kihara | G06F 16/957 709/203 |
| 2010/0153539 A1* | 6/2010 | Zarroli | G06Q 30/02 709/224 |
| 2011/0004664 A1* | 1/2011 | Herberth | H04L 29/12594 709/206 |
| 2011/0182208 A1* | 7/2011 | Shima | G06F 1/266 370/254 |
| 2011/0246563 A1* | 10/2011 | Keum | H04N 7/17318 709/203 |
| 2012/0194864 A1* | 8/2012 | Oshima | G06F 3/1204 358/1.15 |
| 2013/0205381 A1* | 8/2013 | Cain | G06F 21/31 726/7 |
| 2013/0250330 A1* | 9/2013 | Chigusa | H04N 1/00973 358/1.13 |
| 2013/0258408 A1* | 10/2013 | Mizutani | G03G 15/5091 358/1.16 |
| 2014/0180923 A1* | 6/2014 | Choi | G06Q 20/42 705/44 |
| 2015/0052350 A1* | 2/2015 | Aumasson | G06F 21/31 713/155 |
| 2015/0058940 A1* | 2/2015 | Robison | H04L 63/08 726/6 |
| 2015/0193181 A1 | 7/2015 | Katano | |
| 2016/0028795 A1* | 1/2016 | Katano | H04L 67/20 709/203 |
| 2016/0248748 A1* | 8/2016 | Caterino | H04L 63/08 |

* cited by examiner

FIG. 7
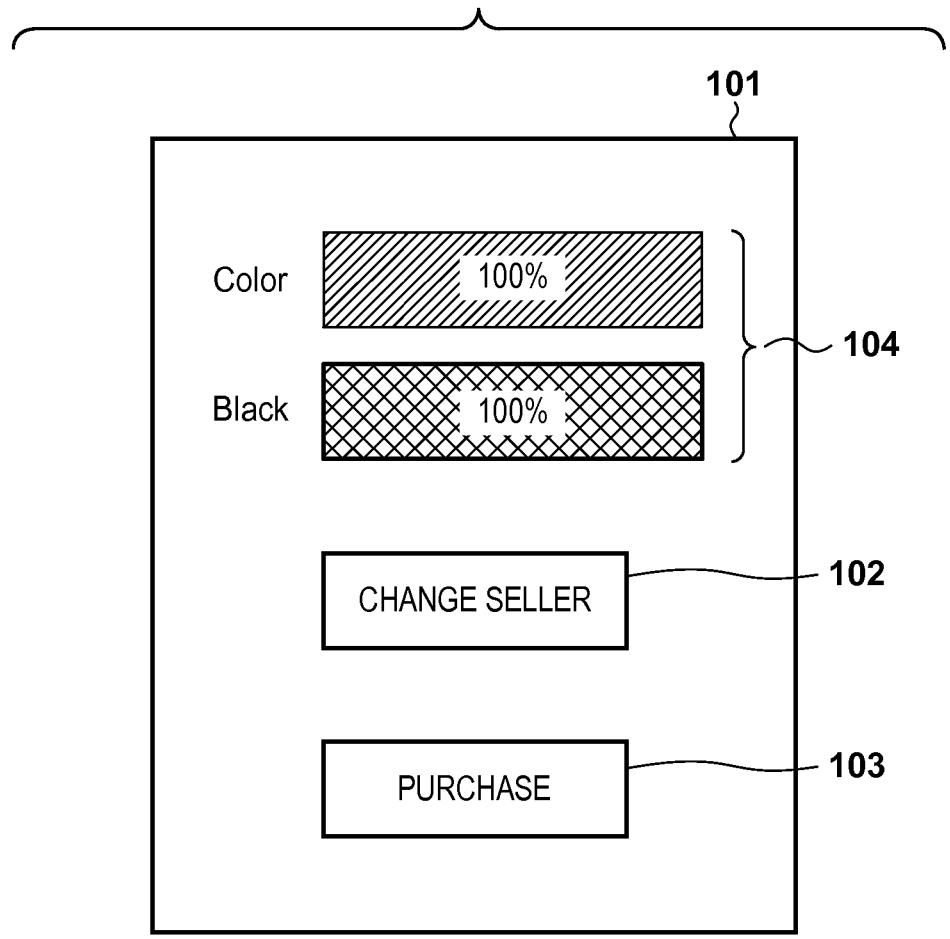
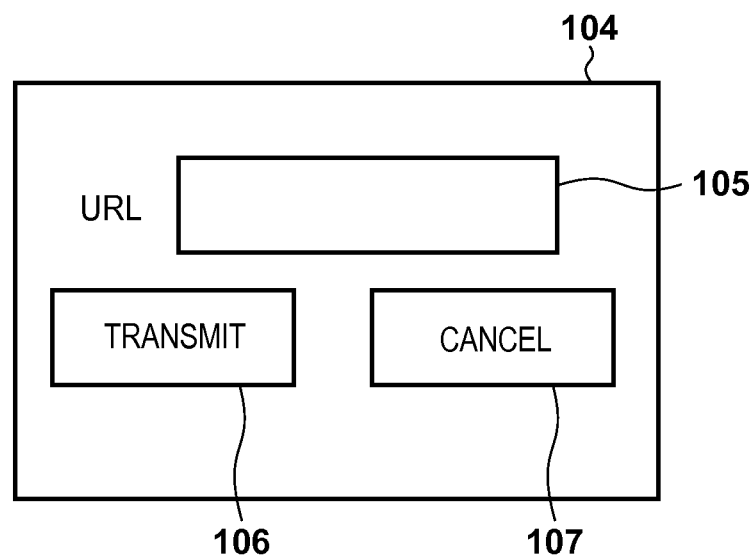

F I G. 11
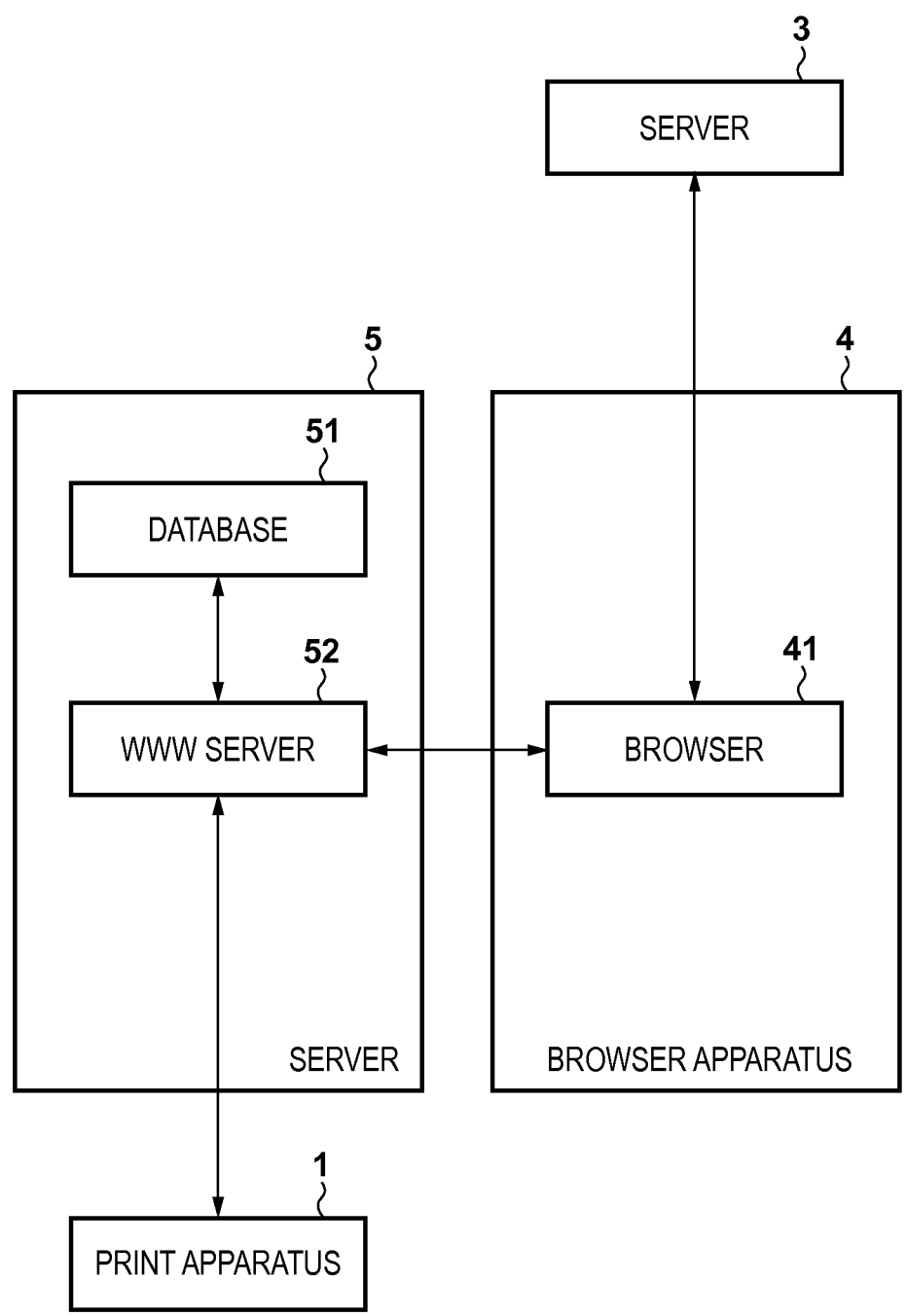

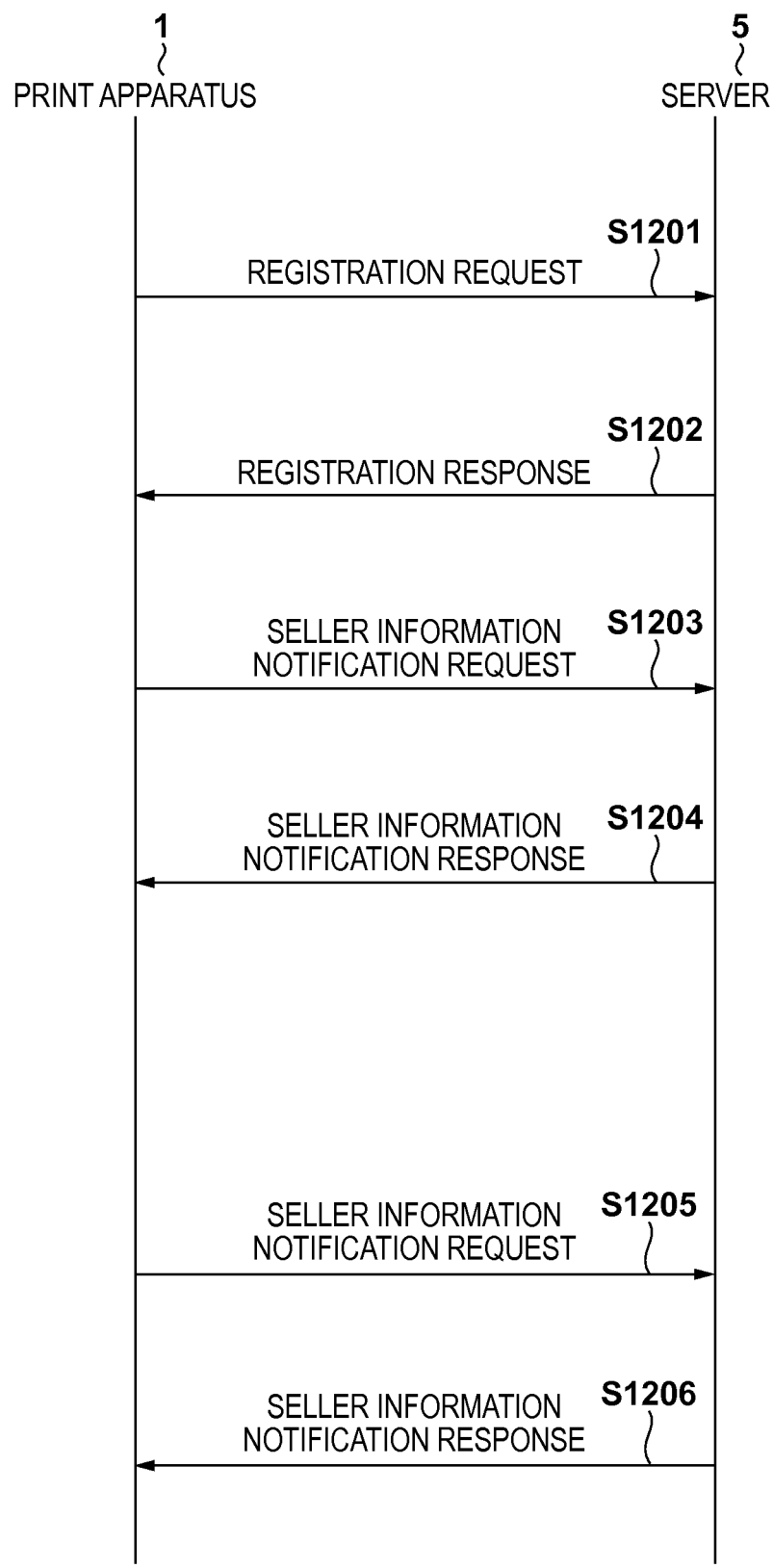

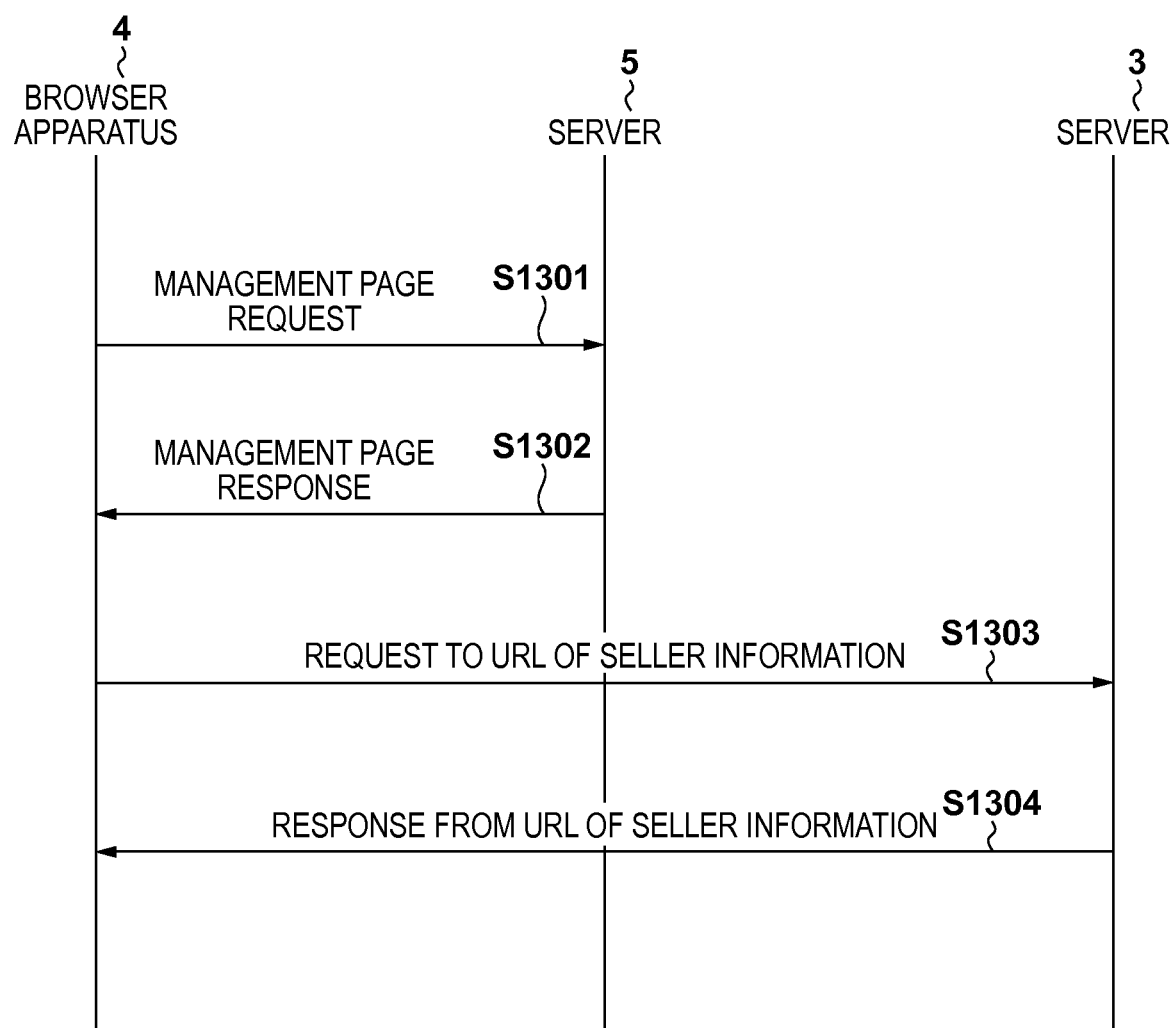

APPARATUS, METHOD, AND NON-TRANSITORY COMPUTER-READABLE STORAGE MEDIUM

BACKGROUND OF THE INVENTION

Field of the Invention

The present invention relates to a technique to allow a plurality of apparatuses to execute processing in coordination.

Description of the Related Art

Conventionally, a client apparatus acquires information related to consumables of a print apparatus and transmits the acquired information to a transfer server, which generates a URL related to the consumables in response. According to one proposed method (see Japanese Patent Laid-Open No. 2005-59303), the client apparatus requests a service providing server for a service based on the generated URL. In this method, as the URL generated by the transfer server is transferred to the client apparatus, a user can be directed to a desired seller without searching for the seller.

However, with the foregoing method, a server to provide a consumable purchase service is restricted by access information (URL) generated by a print apparatus or a transfer server, and access information desired by an administrator cannot be reflected. In a case where a print apparatus is used in a company and the like, there is a demand to purchase consumables from an arbitrary service provider desired by the company for the convenience of an administrator of the print apparatus.

SUMMARY OF THE INVENTION

The present invention has been made in view of the above problem, and provides a technique to set information related to a server in response to a request from an external apparatus and transmit the set information to the external apparatus.

According to the first aspect of the present invention, there is provided an apparatus connectable to an external device, the apparatus comprising: a setting unit that sets information related to a server in response to a request from the external device, the server providing a service related to the apparatus; and a transmission unit that transmits the information related to the server, the information being set by the setting unit.

According to the second aspect of the present invention, there is provided a method for setting information to an apparatus connectable to an external device, the method comprising: a setting step of setting information related to a server in response to a request from the external device, the server providing a service related to the apparatus; and a transmission step of transmitting the information related to the server, the information being set in the setting step.

Further features of the present invention will become apparent from the following description of exemplary embodiments (with reference to the attached drawings).

BRIEF DESCRIPTION OF THE DRAWINGS

FIG. 7 shows examples of HTML documents.

FIG. 11 shows a configuration and connection of a server.

FIG. 12 shows a communication sequence of a print apparatus and a server.

FIG. 13 shows a communication sequence of a browser apparatus and a server.

DESCRIPTION OF THE EMBODIMENTS

The following describes embodiments of the present invention in detail with reference to the drawings.

First Embodiment

Figure 1:
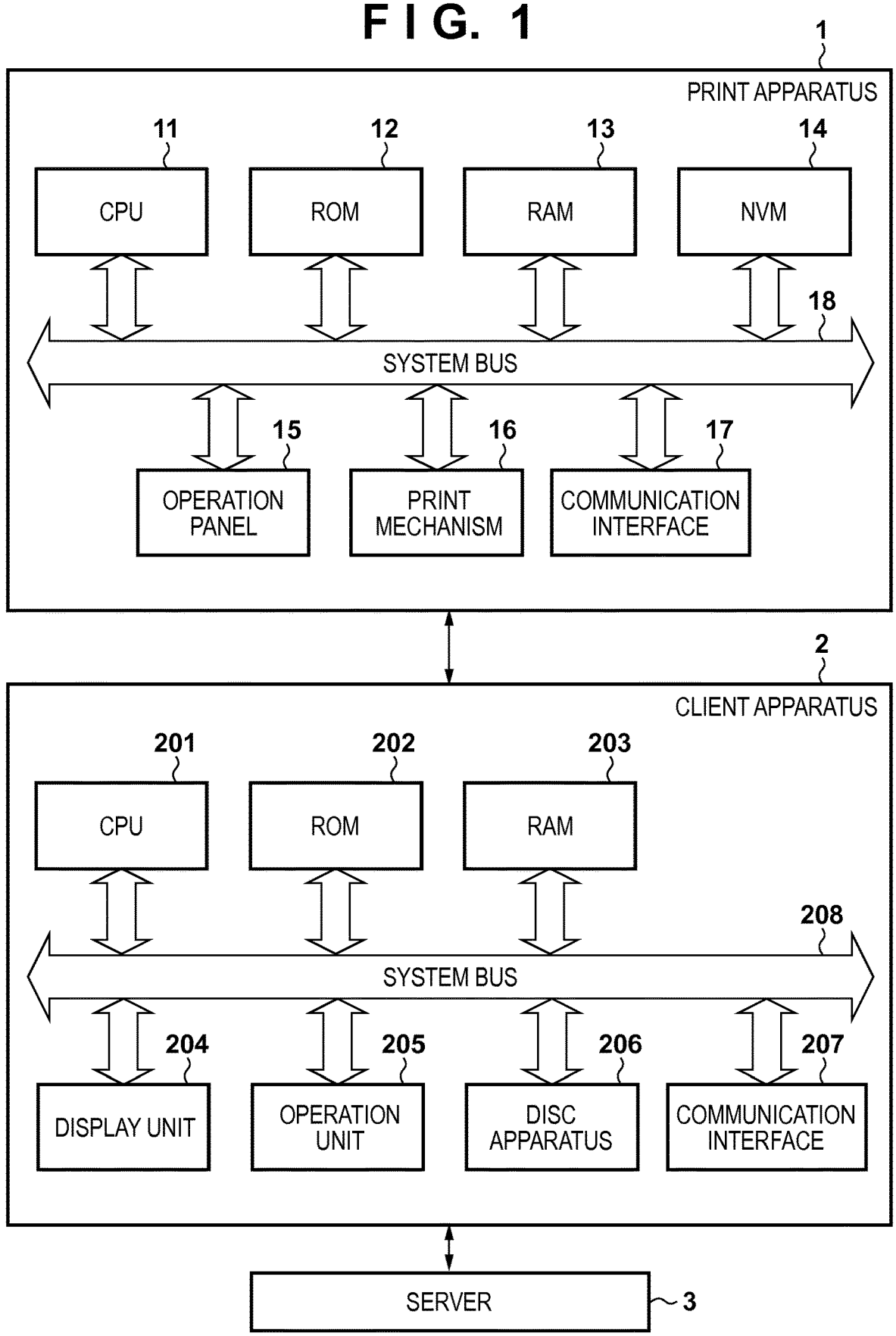
FIG. 1 is a block diagram showing a configuration of a system.

FIG. 1 is a block diagram showing a configuration of a system. This system includes a print apparatus 1, a client apparatus 2, and a server 3 that are connected via a network.

The print apparatus 1 operates with power supplied from a power supply unit (not shown), and includes a CPU 11, a ROM 12, a RAM 13, a non-volatile memory (NVM) 14, an operation panel 15, a print mechanism 16, and a communication interface 17.

The CPU 11 performs various types of control over the print apparatus 1 by reading programs stored in the ROM 12 into the RAM 13 and executing the read programs using the RAM 13 as a working area for the read programs. The non-volatile memory (NVM) 14 is a readable and writable memory that retains contents stored therein even when power is not supplied. It should be noted that the ROM 12 is equipped with a web browser for accessing a web server and displaying a web page.

The operation panel 15 is composed of a display unit, such as an LCD, and an operation unit including various types of switches and a touchscreen, and can display and input information. The print mechanism 16 performs printing under control by the CPU 11. The print mechanism 16 can use various types of print methods such as an inkjet method, a laser beam method, and a thermal transfer method. The communication interface 17 is an interface for communicating with external apparatuses (e.g., external devices such as the client apparatus 2 and a later-described browser apparatus 4). For example, this communication interface may be realized by a serial interface, such as USB, or may be realized by a wire/wireless network interface.

These various types of constituent elements of the print apparatus 1 are connected to one another via a system bus 18 in a manner controllable by the CPU 11.

The client apparatus 2 is any of various types of apparatuses including PCs and smartphones, and includes a CPU 201, a ROM 202, a RAM 203, a display unit 204, an operation unit 205, a disc apparatus 206, and a communication interface 207. Various types of processing of the client apparatus 2 can be realized by, for example, installing predetermined software in an information processing apparatus such as a general-purpose PC.

The CPU 201 controls various types of constituent elements of the client apparatus 2 that are connected to one another via a system bus 208. The disc apparatus 206 installs programs, such as application programs and an operating system (OS), that are read by the CPU 201, and also stores data of various types of files, etc. This disc apparatus 206 may be an external disc reading apparatus for reading contents of an external storage medium such as a CD-ROM. The ROM 202 stores, for example, data of program codes read by the CPU 201. The RAM 203 is a memory used when the CPU 201 executes processing related to temporary data storage, buffering, and the like whenever necessary. The CPU 201 can realize various types of processing by executing, on the RAM 203, various types of programs stored in the ROM 202 or the disc apparatus 206.

Various types of programs stored in the disc apparatus 206 include various types of device drivers such as a printer driver for using the print apparatus 1. These various types of programs include various types of applications such as a polling application for inquiring a condition of the print apparatus 1 (whether there is an event), and management software for managing a condition (status) of the print apparatus 1 (status monitor).

The display unit 204 is constituted by a display apparatus including an LCD and the like, and displays various types of information. The operation unit 205 is composed of input apparatuses, such as a keyboard, a mouse, and a touchscreen, and accepts a user operation. The communication interface 207 connects the client apparatus 2 to a network to perform various types of communications. The communication interface 207 is an interface that is compatible with at least one of serial communication (e.g., USB communication), wire communication, and wireless communication). Specifically, it exerts necessary functions and modes in accordance with a network with which the communication interface 17 built in the print apparatus 1 is compatible.

The client apparatus 2 uses the server 3 that provides various types of services. A web browser operates in the client apparatus 2, a web server operates in the server 3 due to a web server function, and communication between the client apparatus 2 and the server 3 can be performed using, for example, the HTTP. One example of the client apparatus 2 is an information processing apparatus such as a personal computer (PC); however, it is not limited to being a PC as long as it is an electronic device equipped with a web browser. For example, it may be a smartphone, a tablet, a digital television, or a similar device equipped with a web browser.

A configuration of the server 3 is similar to a configuration of the client apparatus 2, except for a program for realizing different functions in accordance with processing to be realized, and a hardware performance for realizing more advanced processing.

In the above-described manner, a processing system can be configured in which the print apparatus 1, the client apparatus 2, and the server 3 are connected via a network. One example of this network is a local area network (LAN). Although the following description involves a network constructed by wire network cables, no limitation is intended in this regard. Similar effects are achieved by any network mode, whether it be a wireless network or be a network in which wire and wireless networks coexist.

The present embodiment introduces a system in which the print apparatus 1, the client apparatus 2, and the server 3 efficiently arrange a purchase of consumables of the print apparatus 1 in coordination with one another.

Here, consumables denote various types of components and members that are consumed when the functions of the print apparatus 1 are used in accordance with such use. For example, in a case where the print apparatus 1 uses an inkjet method, consumables include ink that serves as a recording agent used in printing, a recording head for ejecting ink, and sheets of recording paper that serve as recording mediums used in printing an image. On the other hand, in a case where the print apparatus 1 uses a laser beam method, consumables include toner that serves as a recording agent, a toner cartridge that serves as a container filled with toner, and sheets of recording paper. Consumables are not limited to the foregoing items, and there may be any consumables that are consumed in accordance with a print method of the print apparatus 1 as appropriate.

Figure 2:
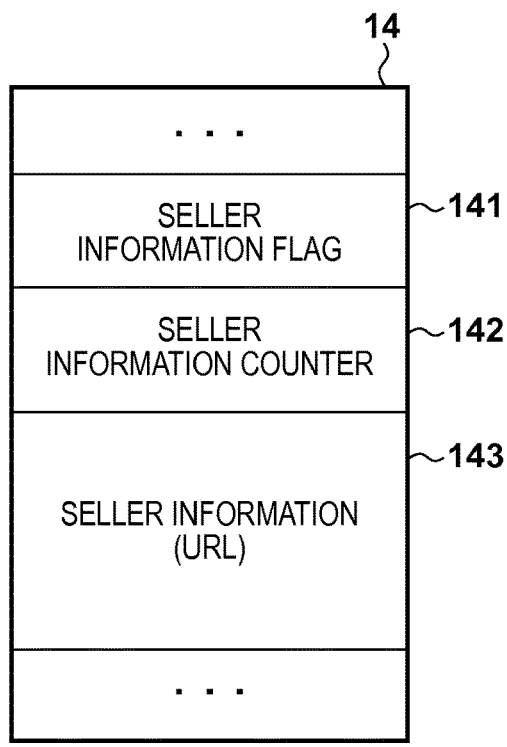
FIG. 2 shows a configuration of a non-volatile memory.

In the print apparatus 1, information related to consumables is stored in the non-volatile memory 14. FIG. 2 shows information related to consumables stored in the non-volatile memory 14.

In the figure, reference numeral 141 denotes a seller information flag indicating whether to use seller information 143 stored in the non-volatile memory 14. The seller information 143 indicates a seller of consumables. The seller information flag 141 takes two values, "0" and "1"; "0" indicates that the client apparatus 2 is not to use the stored seller information 143, whereas "1" indicates that the client apparatus 2 is to use the seller information 143. The print apparatus 1 provides the seller information 143 to the client apparatus 2 on the condition that the seller information flag 141 is "1". The details will be described later.

It should be noted that a user can update the seller information 143 as appropriate in the present embodiment. Reference numeral 142 denotes a seller information counter storing the number of times the seller information 143 has been updated. A value of this seller information counter 142 is updated, e.g., incremented by one, each time the seller information 143 is changed. Upon reaching an upper limit value corresponding to a memory capacity for the seller information counter 142, this counter is reset to one, followed by repetition of one-by-one increment again. It is assumed that the foregoing upper limit value is at least 197 or larger. In a case where the seller information 143 has never been set, the seller information 143 does not include a URL. Therefore, when the seller information counter 142 is "0", the seller information flag 141 is set to "0".

As stated earlier, reference numeral 143 denotes seller information indicating a seller of consumables. Specifically, this seller information 143 indicates the location of the server 3 that provides a consumable purchase service, and is represented by a URL and the like. It should be noted that it may be represented by other access information, such as an IP address and a URI, as long as it is information that enables access to the seller. In addition to the seller information 143, multiple types of seller information (default seller information) are separately prestored in the non-volatile memory 14 in accordance with intended uses and purposes. In particular, in a case where the content of the seller information 143 has been cleared and in a case where the seller information flag 141 is "0", such default seller information is used.

As indicated above, the seller information 143 of consumables stored in the non-volatile memory 14 is used to store access information (e.g., URL) indicating the location of the server 3 that provides a desired consumable purchase service, the access information being set by an administrator (user) of the print apparatus 1. With the use of the non-volatile memory 14, the stored access information is retained even after the power of the print apparatus 1 is turned off.

It should be noted that the print apparatus 1 provides the seller information 143 and the default seller information to an external device, and the external device accesses the corresponding seller. In addition, with the use of the web browser in the ROM 12, the print apparatus 1 itself can also access the seller of consumables in accordance with the seller information 143 and the default seller information. Specifically, in response to a user instruction issued on the operation panel 15 of the print apparatus 1, the print apparatus 1 accesses an external web server in accordance with the seller information 143 or the default seller information. The seller information 143 is changed in response to a request from the external device through later-described processing. Therefore, the changed seller information 143 is shared between the external device and the print apparatus 1.

Figure 3:
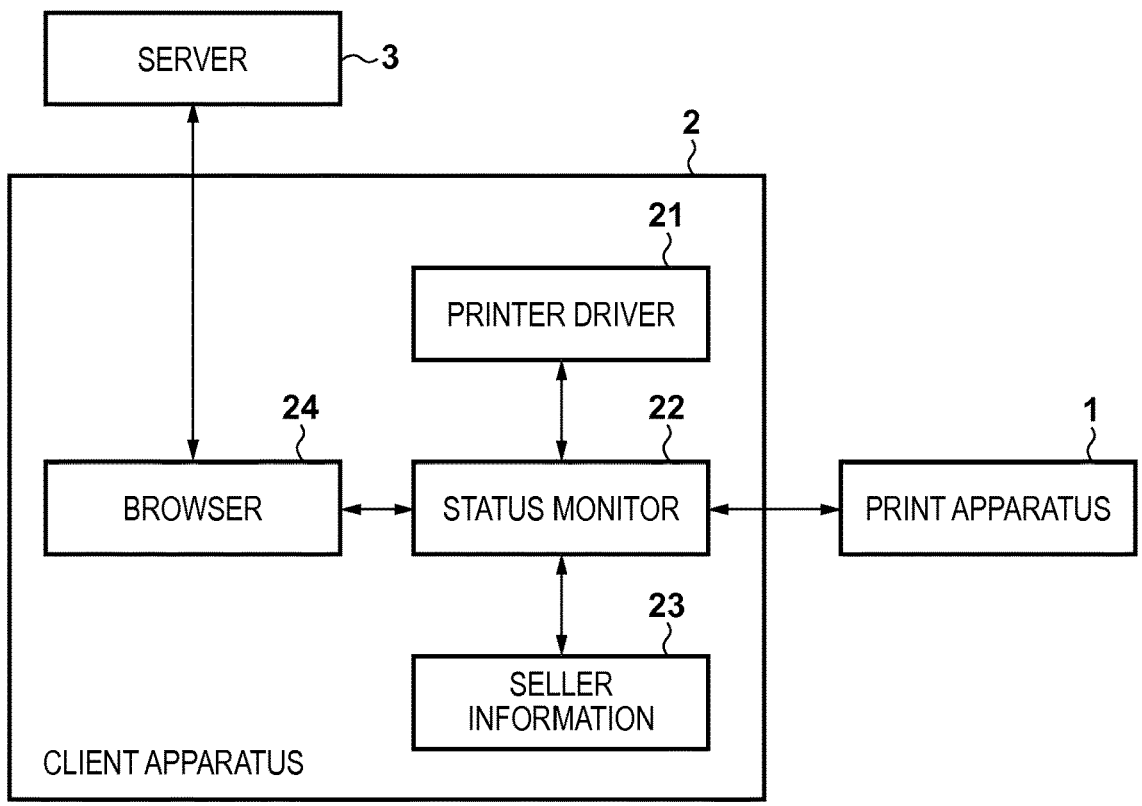
FIG. 3 shows a functional configuration and connection of a client apparatus.

FIG. 3 shows a functional configuration and connection of the client apparatus 2. In particular, FIG. 3 shows a group of functions that are realized by the CPU 201 of the client apparatus 2 reading programs stored in the ROM 202 or the disc apparatus 206 and executing the read programs on the RAM 203. As such, the client apparatus 2 is an information processing apparatus that performs control based on programs operating on the operating system (OS).

A printer driver 21, which is a program operating on the OS, communicates with the print apparatus 1 via the communication interface 207 of the client apparatus 2, and transmits print data from the client apparatus 2 to the print apparatus 1 to cause the print apparatus 1 to perform printing.

A status monitor 22, which is a program operating on the OS, communicates with the print apparatus 1 and displays a condition of the print apparatus 1 on the display unit 204 of the client apparatus 2. Seller information 23 is stored in the disc apparatus 206 of the client apparatus 2, and corresponds to seller information stored in the non-volatile memory 14 of the print apparatus 1. When the status monitor 22 receives, from the print apparatus 1, seller information as one type of condition information of the print apparatus 1, the seller information 23 in the client apparatus 2 is updated. It should be noted that the status monitor 22 also retains seller information similar to default seller information stored in the print apparatus 1. Alternatively, it may acquire the default seller information from the print apparatus 1 similarly to the seller information 143.

A browser 24 is a program operating on the OS. It communicates with the server 3 based on the Hypertext Transport Protocol (HTTP), and displays a document described in the Hypertext Markup Language (HTML) returned from the server 3. The server 3 functions as a consumable purchase service providing apparatus that provides a consumable purchase service for purchasing consumables of the print apparatus 1. For example, the server 3 receives a request based on the HTTP from the client apparatus 2, and returns an HTML document related to a purchase of consumables to the client apparatus 2 in response to the request.

Figure 4:
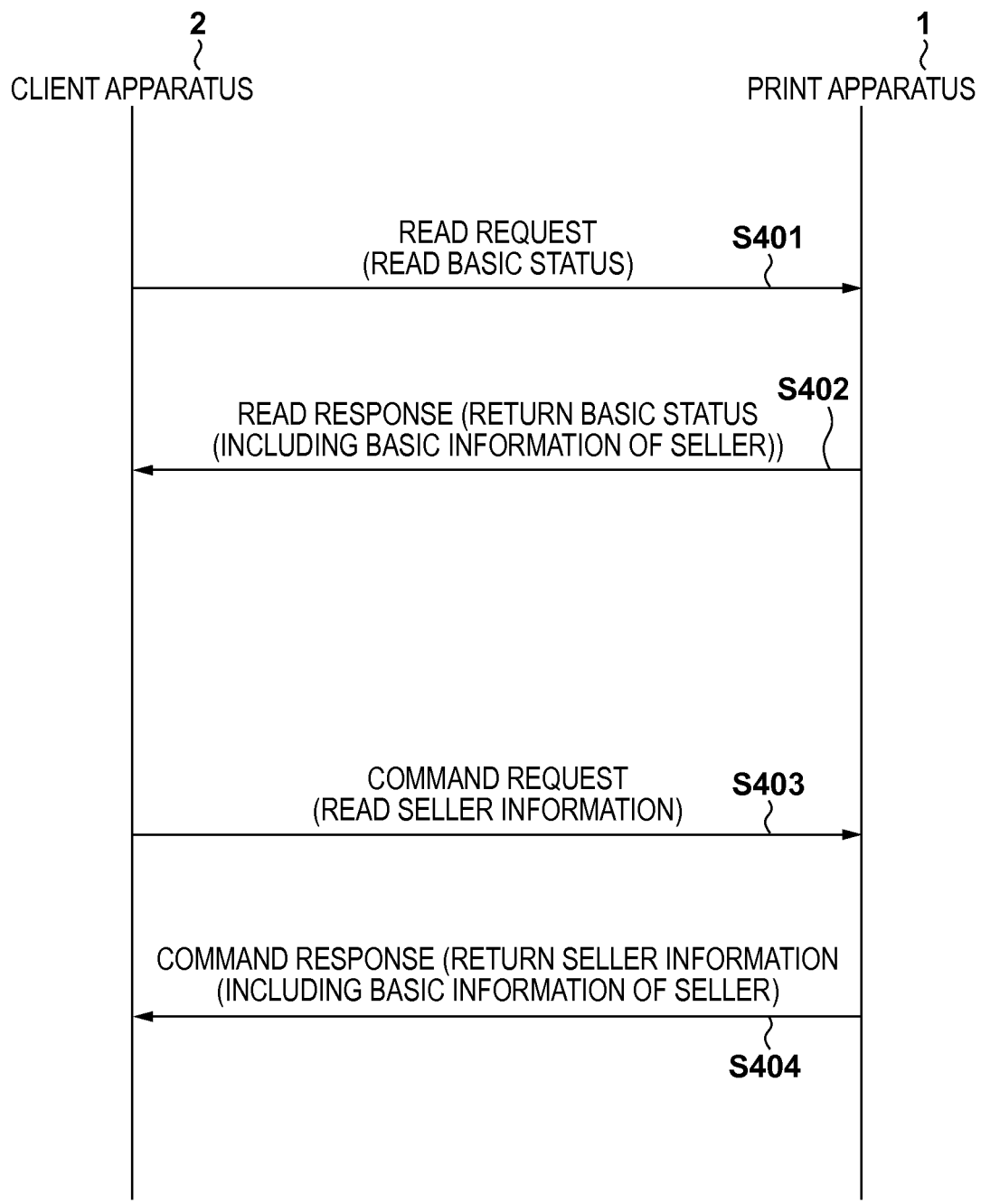
FIG. 4 shows a communication sequence of a client apparatus and a print apparatus.

FIG. 4 shows a communication sequence of the client apparatus 2 and the print apparatus 1. In the figure, step S401 involves a read request, step S402 involves a read response, step S403 involves a command request, and step S404 involves a command response. It is assumed that these communications are performed between the printer driver 21 and the status monitor 22 of the client apparatus 2 and the print apparatus 1.

In step S401, the status monitor 22 of the client apparatus 2 transmits, to the print apparatus 1, a read request for reading a basic status of the print apparatus 1.

In step S402, the print apparatus 1 returns, to the client apparatus 2, a read response including basic information related to seller information in response to the read request of step S401. Here, the basic information related to seller information allows the client apparatus 2 to acknowledge a condition of seller information stored in the print apparatus 1. For example, the basic information includes an integer selected from among 0 to 99 based on the seller information counter 142. A value "0" indicates that the seller information 143 has never been updated and the seller information flag 141 is 0. When the seller information flag 141 has a value "1", the foregoing integer is 1 to 99, and the value thereof is changed each time the seller information 143 is changed. That is to say, the client apparatus 2 acknowledges a change in the seller information 143 in the print apparatus 1 due to a change in the value of the basic information.

In step S403, a command request is used to make a request other than the request for reading the basic status of the print apparatus 1, and it is assumed that various commands corresponding to intended uses have been prepared thereas. Therefore, the client apparatus 2 can transmit the command request to the print apparatus 1 whenever necessary in step S403. A command response of step S404 is a response to the command request of step S403; the print apparatus 1 executes processing corresponding to the command request of step S403, and returns, to the client apparatus 2, a response including the result of the processing as the command response in step S404. In particular, it is assumed here that a seller information read command for reading the seller information 143 stored in the non-volatile memory 14 of the print apparatus 1 is used as the command request of step S403. That is to say, with the use of the seller information read command, the client apparatus 2 can read and acquire the content of the seller information 143 stored in the print apparatus 1.

Transmission and reception of such commands are commonly performed as inter-apparatus communications, and no particular limitation is intended in this regard. Therefore, a detailed description of a communication method therefor is omitted.

Figure 5:
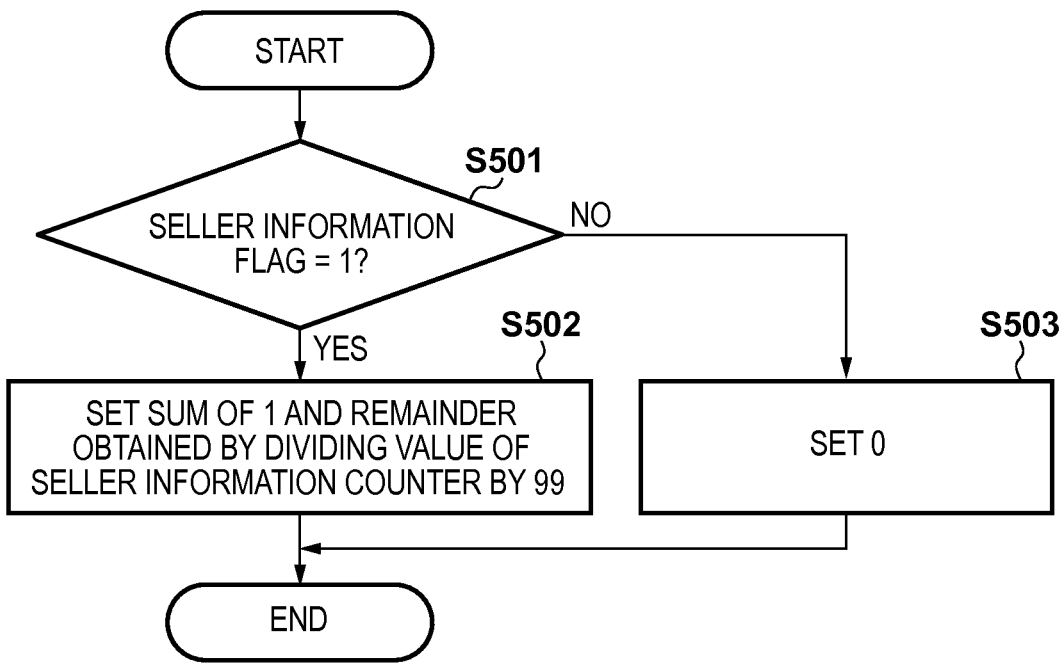
FIG. 5 is a flowchart showing processing for giving notice of seller information.

FIG. 5 is a flowchart of processing in which the print apparatus 1 notifies the client apparatus 2 of basic information related to seller information. It should be noted that the flowchart shown in FIG. 5 is realized by the CPU 11 of the print apparatus 1 reading a program stored in the ROM 12 of the print apparatus 1 into the RAM 13 and executing the read program. This processing is started when the print apparatus 1 receives the read request of step S401 shown in FIG. 4 from the client apparatus 2.

When the print apparatus 1 receives the read request of step S401, the CPU 11 determines whether the value of the seller information flag 141 in the non-volatile memory 14 is "1" in step S501. If the value is "1" (YES in step S501), the CPU 11 sets a sum of 1 and a remainder obtained by dividing the value of the seller information counter 142 by 99 in step S502. On the other hand, if the value of the flag is "0" (NO in step S501), the CPU 11 sets "0" as a value to be included in basic information. Thereafter, the print apparatus 1 includes the value set in step S502 or S503 into the read response of step S402 as basic information related to seller information, and returns the read response to the client apparatus 2.

The client apparatus 2 determines whether to acquire the seller information from the print apparatus 1 based on the basic information of the seller information included in the read response of step S402. That is to say, it compares the value of basic information that was previously read with the value of basic information that has just been read; if these values are different, it acknowledges a change in the seller information, and if the value of the basic information is not 0, it acquires the seller information 143. On the other hand, if the value of the basic information is 0, the client apparatus 2 requests a default value as the seller information in step S403. In response to this request, the print apparatus 1 returns the default seller information. With the use of the read seller information, the client apparatus 2 can issue a purchase order for consumables to a server indicated by the seller information.

As stated earlier, the printer driver 21 and the status monitor 22 are programs that operate on the OS of the client apparatus 2, and they become operable when installed. When performing communication with the print apparatus 1 for the first time after the installation, the seller information 143 is read. Provided that a unit of instruction for printing a single document from the client apparatus 2 to the print apparatus 1 is called a job, the seller information is read each time a job is completed. In any other situations, the client apparatus 2 can read the seller information as appropriate whenever necessary.

Figure 6:
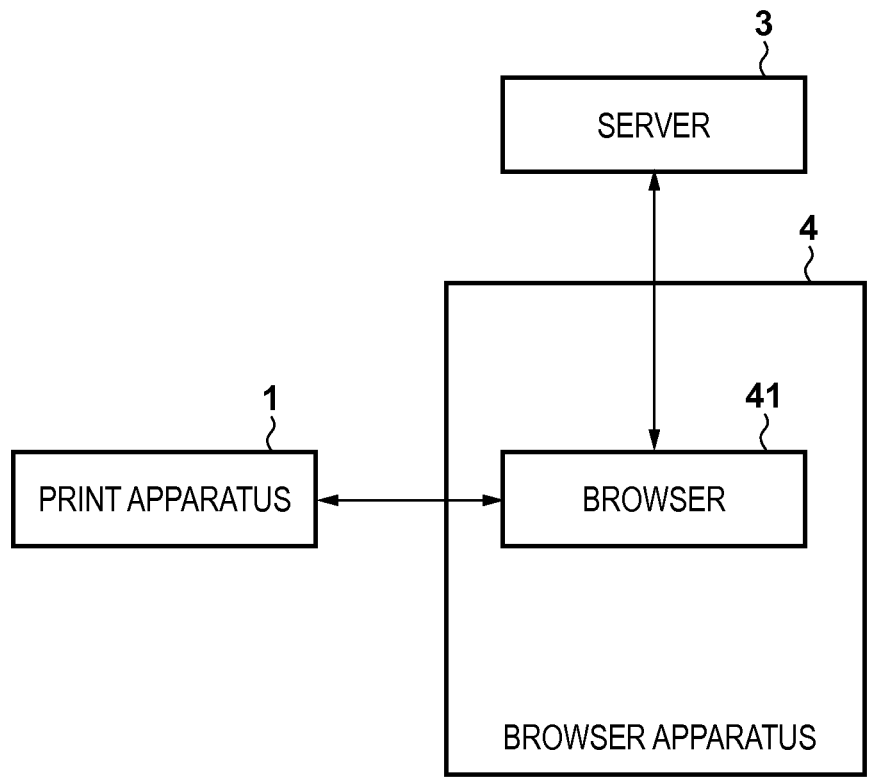
FIG. 6 shows a configuration and connection of a browser apparatus.

FIG. 6 shows a configuration and connection of the browser apparatus 4. In the figure, reference numeral 41 denotes a browser. The browser apparatus 4 is a host apparatus similarly to the client apparatus 2, and the browser 41 is a program that operates on an OS of the browser apparatus 4. It should be noted that the browser apparatus 4 is any of various types of apparatuses including PCs and smartphones. The browser apparatus 4 is connected to the print apparatus 1 and the server 3 via a network in such a manner that it can communicate with them. The browser 41 transmits an HTTP request to an HTTP server, receives an HTTP response from the print apparatus 1, and displays a rendered version of a received HTML document. It should be noted that the browser apparatus 4 and the client apparatus 2 may be realized by the same apparatus. A hardware configuration of the browser apparatus 4 is similar to that of the client apparatus 2 shown in FIG. 1.

The print apparatus 1 operates as an HTTP server based on a program stored in the ROM 12. It receives an HTTP request via the communication interface 17, executes processing corresponding to the HTTP request, and transmits an HTTP response. Similarly to the case of an ordinary HTTP server, an HTML document is mainly returned as the HTTP response. That is to say, provided that an external apparatus to which an HTML document is transmitted uses a browser, the print apparatus 1 transmits dialog information of various types of operation dialogs that can be displayed by the external apparatus.

FIG. 7 shows structures of pages that are displayed based on HTML documents returned from the HTTP server represented by the print apparatus 1. In FIG. 7, reference numeral 101 denotes a main page represented by an HTML document (e.g., index.html); the figure depicts an example case in which the main page 101 is displayed by the browser 41 of the browser apparatus 4. The browser apparatus 4 transmits an HTTP request for reading the basic status of the print apparatus 1 to the print apparatus 1, and receives, in return, an HTTP response that enables reception and display of the main page 101.

The main page 101 contains display of information related to consumables, in particular, display 104 of remaining amounts of color ink and black ink as consumables. The main page 101 also contains a "change seller" button 102 for issuing an instruction for changing the seller of consumables, as well as a "purchase" button 103 for accessing the server 3 indicated by designated seller information so as to purchase consumables.

In the figure, reference numeral 104 denotes an example of a seller setting page (e.g., page1.html) that is returned from the print apparatus 1 to the browser apparatus 4 and is displayed by the browser 41 when the "change seller" button 102 has been pressed. Also, in the figure, reference numeral 105 denotes an edit box for inputting/editing a URL serving as seller information, and allows the user to input/edit desired seller information. Reference numeral 106 denotes a "transmit" button for issuing an instruction for transmitting the input URL to the print apparatus 1. Reference numeral 107 denotes a "cancel" button for cancelling the input of the URL.

With the use of this seller setting page on the browser apparatus 4, the seller information 143 registered with the print apparatus 1 can be changed or newly added. In particular, when the "transmit" button 106 has been pressed, an HTTP request including the URL, i.e., seller information input to the edit box 105 is transmitted to the print apparatus 1 as a request for changing the seller information 143. It should be noted that when the "transmit" button 106 is pressed without inputting anything to the edit box 105, for example, an HTTP request including a NULL character string, which is distinguished from a URL, is transmitted to the print apparatus 1. In this case, upon receiving this HTTP request including the NULL character string, the print apparatus 1 clears the seller information registered therewith.

Figure 8:
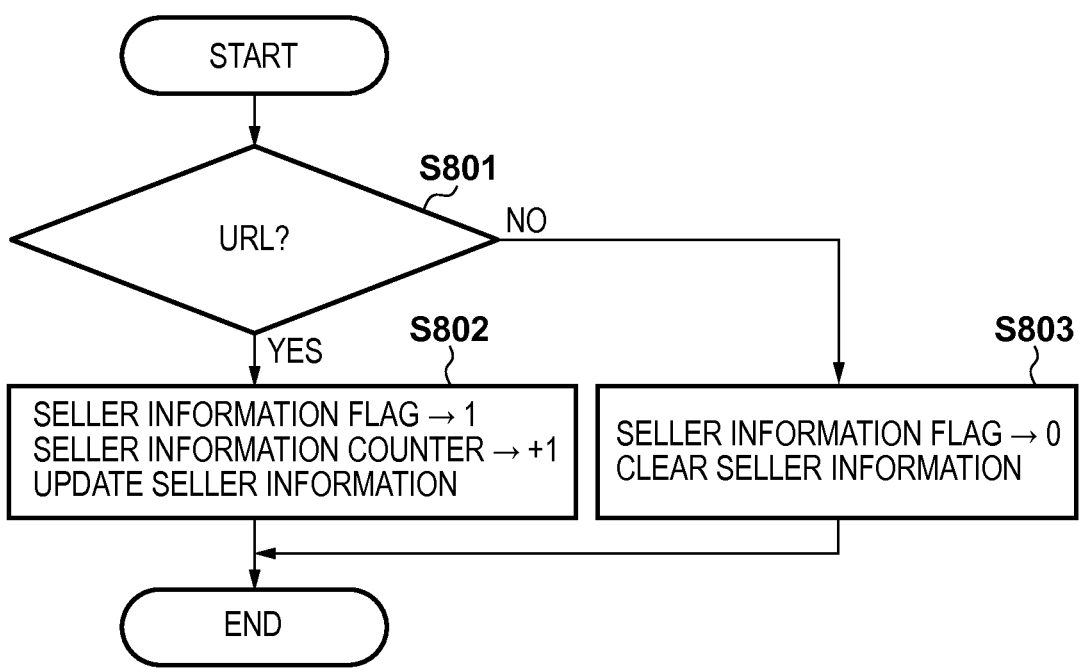
FIG. 8 is a flowchart showing processing for changing seller information.

FIG. 8 is a flowchart of processing in which the print apparatus 1 changes seller information. It should be noted that the flowchart shown in FIG. 8 is realized by the CPU 11 of the print apparatus 1 reading a program stored in the ROM 12 of the print apparatus 1 into the RAM 13 and executing the read program.

When the print apparatus 1 receives an HTTP request for changing seller information, the CPU 11 first determines whether the HTTP request includes a URL as a process of an HTTP server in step S801. This determination is realized by determining whether the HTTP request includes a character string indicating a URL. If a URL is included (YES in step S801), the CPU 11 sets the value of the seller information flag 141 to "1", and increments the seller information counter 142 by one. Then, it updates the seller information 143 by storing the URL included in the HTTP request thereas.

On the other hand, if no URL is included (NO in step S801), the CPU 11 changes the value of the seller information flag 141 to "0" and clears the seller information 143 in step S803.

Upon completion of processing, the print apparatus 1 returns an HTML document corresponding to the result to the browser apparatus 4 as an HTTP response.

It should be noted that buttons indicating "default seller", "clear seller information set by user", and the like may be displayed on the dialog 104 shown in FIG. 7. When these buttons are pressed as user instructions, an HTTP request without a URL may be transmitted to the print apparatus 1.

In this case also, the seller information 143 is cleared in the process of step S803, and the default seller information is used in later-described processing of FIG. 9.

Figure 9:
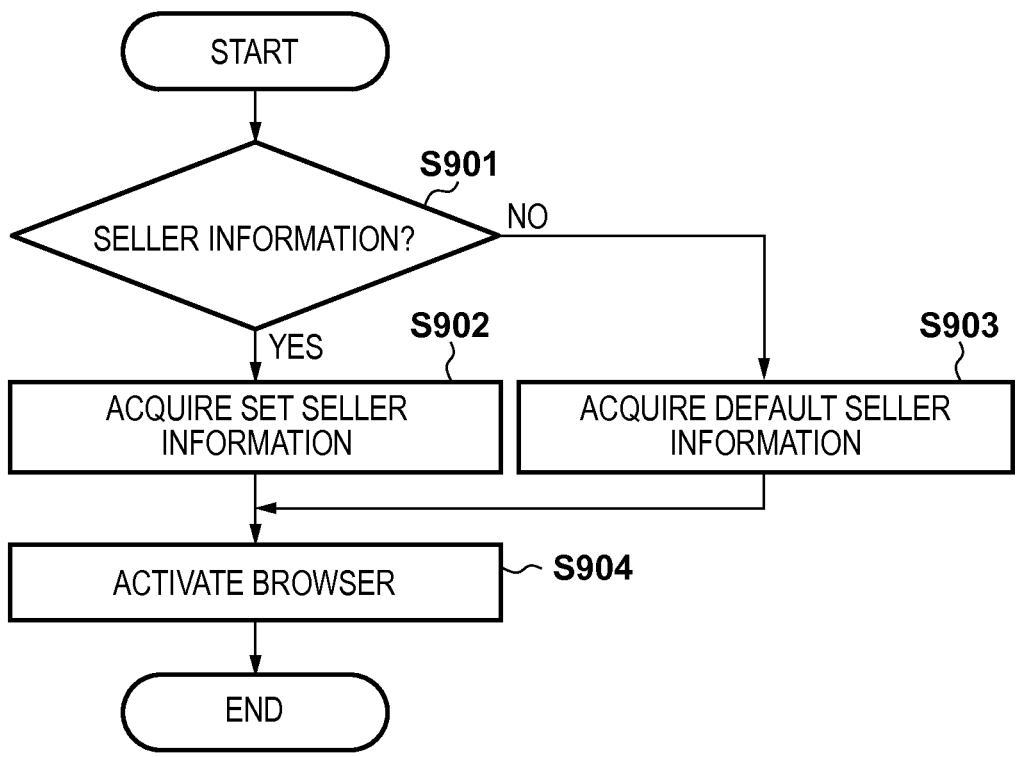
FIG. 9 is a flowchart showing processing executed by a client apparatus.

FIG. 9 is a flowchart of the client apparatus 2. It should be noted that the flowchart shown in FIG. 9 is realized by the CPU 201 of the client apparatus 2 reading a program stored in the ROM 202 of the client apparatus 2 into the RAM 203 and executing the read program. Here, the processing of FIG. 9 is called up by pressing a consumable purchase button on a display dialog provided by the status monitor 22 (e.g., the "purchase" button 103 shown in FIG. 7). The consumable purchase button may be on a main dialog provided by the status monitor 22. The consumable purchase button may also be on a printer setting dialog. Alternatively, the consumable purchase button may be on an error dialog that is displayed when an ink exhaustion error occurs, or on a dialog provided by the status monitor 22 to show remaining amounts of ink.

It should be noted that the program corresponding to the processing shown in FIG. 9 is called up when the print apparatus 1 transmits the seller information 143 to the client apparatus 2 in step S404. When the present processing is called up, the CPU 201 first determines whether a URL has been set to the seller information 143 in step S901. If a URL has been set (YES in step S901), the CPU 201 acquires the seller information 143 to which the URL has been set in step S902. On the other hand, if no URL has been set (NO in step S901), the CPU 201 acquires default seller information that is retained as a default by the status monitor 22 in step S903.

In step S904, the CPU 201 activates the browser 41 by passing the acquired seller information thereto. The browser 41 transmits an HTTP request to the server 3 based on the passed seller information so as to receive a consumable purchase service. Here, whether the acquired seller information actually exists may be determined, and if it does not actually exist, the seller information stored in the print apparatus 1 may be read again. A timing for reading the seller information is not limited to the above-described timing. For example, in a case where a purchase operation is performed via the server 3, on the occurrence of an error (e.g., ink exhaustion) in the print apparatus 1, the seller information may be read at an arbitrary timing, e.g., when the status (e.g., remaining amounts of ink) of the print apparatus 1 is confirmed. Confirmation of statuses and confirmation of operational conditions can be made among apparatuses using known techniques such as ordinary polling and push/pull notification.

Figure 10:
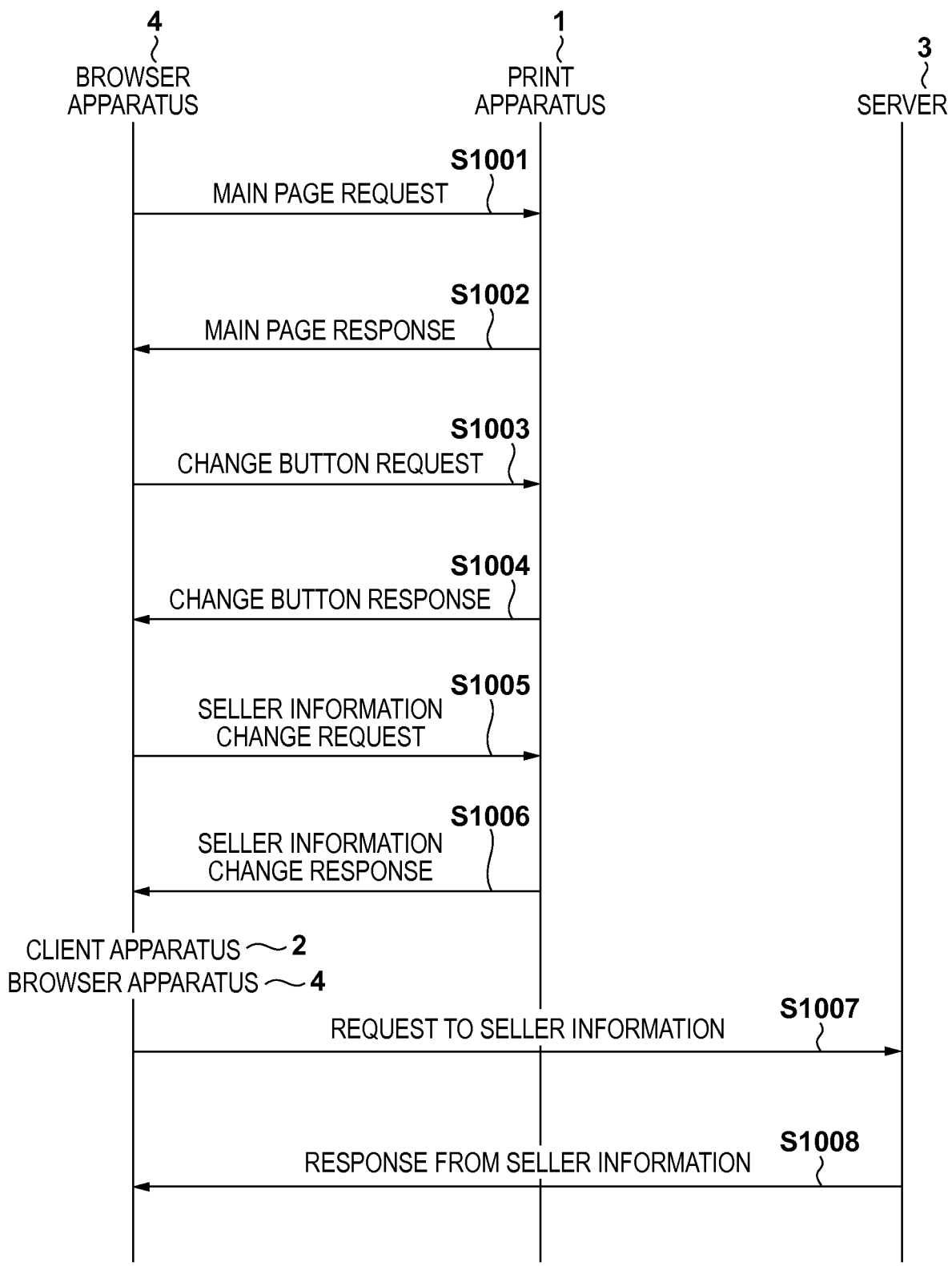
FIG. 10 shows a communication sequence of a browser apparatus, a print apparatus, and a server.

FIG. 10 shows a communication sequence of the browser apparatus 4.

First, a description is given of a communication sequence for a case in which the administrator changes seller information of consumables. It should be noted that this communication sequence is executed when the processing shown in FIG. 8 is executed. The following describes an example case in which the communication sequence is executed between the browser apparatus 4 and the print apparatus 1; however, in a case where the client apparatus 2 also functions as the browser apparatus 4, the communication sequence is executed between the client apparatus 2 and the print apparatus 1.

The browser apparatus 4 transmits a main page request to the HTTP server represented by the print apparatus 1 in step S1001. This main page is, for example, the page related to the purchase of consumables shown in FIG. 7. In response to reception of the main page request in step S1001, the print apparatus 1 transmits a main page response including an HTML document of a main page (index.html) to the browser apparatus 4 in step S1002.

In response to pressing of the "change seller" button 102 on the main page 101, the browser apparatus 4 transmits a change button request corresponding thereto to the print apparatus 1 in step S1003. In response to reception of the change button request in step S1003, the print apparatus 1 transmits a change button response including an HTML document (page1.html) for changing a seller to the browser apparatus 4 in step S1004.

The browser apparatus 4 transmits a seller information change request corresponding to pressing of the "transmit" button 106 to the print apparatus 1 in step S1005. In response to reception of the seller information change request in step S1005, the print apparatus 1 transmits, to the browser apparatus 4, a seller information change response including an HTML document of a main page on which a link destination of the "purchase" button 103 has been updated to post-change seller information (URL) in step S1006.

Next, a description is given of a communication sequence for a case in which the user purchases consumables. It should be noted that this communication sequence is executed when the processing shown in FIG. 9 is executed. The following describes an example case in which the communication sequence is executed between the client apparatus 2 and the print apparatus 1; however, in a case where the client apparatus 2 also functions as the browser apparatus 4, the communication sequence is executed between the browser apparatus 4 and the print apparatus 1.

The client apparatus 2 transmits an HTTP request to the server 3 indicated by the seller information, i.e., the link destination of the "purchase" button 103 in step S1007. In response to reception of the HTTP request in step S1007, the server 3 transmits an HTTP response including an HTML document to the client apparatus 2 in step S1008. The client apparatus 2 displays the received HTML document so as to allow the user to use the consumable purchase service provided by the server 3.

Although the above has described operations initiated by the client apparatus 2 or the browser apparatus 4, which is an external apparatus from a viewpoint of the print apparatus 1, no limitation is intended in this regard. For example, in a case where the print apparatus 1 itself has a browser function, a purchase instruction may be issued by operating the operation panel 15, and the browser function of the print apparatus 1 may transmit a request to the server 3 indicated by seller information.

As described above, in the first embodiment, a client apparatus that uses the print apparatus 1 can be notified of seller information indicating the location of a server that provides a consumable purchase service, the seller information being set by the administrator of the print apparatus 1. In this way, the user can receive a service provided by a seller desired by the administrator without performing a special operation. Furthermore, for example, seller information indicating the location of a purchase service providing server of an in-house purchase department can be set as a seller desired by the administrator.

Moreover, in the first embodiment, the print apparatus 1 can connect to a plurality of external devices (client apparatus 2, browser apparatus 4), and transmit the same seller information to any of these apparatus. For example, in a company, there may be a demand to cause a plurality of external devices, such as PCs and smartphones, to access one particular seller. In this case, the present embodiment can cause the plurality of external devices to access the same seller by having them store seller information corresponding to that seller.

Although the above has described a case in which the administrator configures desired settings with regard to seller information of consumables, the same goes for display of an operational guide or help concerning the print apparatus 1. For example, when the status monitor 22 of the client apparatus 2 displays an error of the print apparatus 1, there may be information of a link destination of an online operational guide or help about the displayed error. The mechanism of seller information can be applied to replace such information of the link destination of the online operational guide or help with information of a link destination designated by the administrator. The same goes for a case in which the HTTP server represented by the print apparatus 1 is accessed using the browser apparatus 4.

Second Embodiment

The above has described an example in which the print apparatus 1 itself stores the seller information 143. Below is a description of an example in which the print apparatus 1 causes an external server to store seller information.

FIG. 11 shows a configuration and connection of a server 5 that provides a cloud service. In the figure, the server 5 provides a cloud service, reference numeral 51 denotes a database that stores seller information, and reference numeral 52 denotes a WWW server. The database 51 manages stored data as a back end of the server 5. The WWW server 52 processes an HTTP request received from a browser apparatus 4 (or a client apparatus 2) and returns a response. A hardware configuration of the server 5 is similar to the hardware configurations of the client apparatus 2 and the server 3 shown in FIG. 1. The server 5 connects to a print apparatus 1 and to the browser apparatus 4. The browser apparatus 4 connects to a server 3 that provides a consumable purchase service.

It should be noted that a cloud is a system that enables interactions among service providers through on-demand access to a shared pool of configurable computer resources such as a network, a server, a storage apparatus, an application, and a service.

FIG. 12 shows a communication sequence of the print apparatus 1 and the server 5.

First, the print apparatus 1 transmits a registration request for registering itself to the server 5 in step S1201. In response to reception of the registration request in step S1201, the server 5 transmits a registration response to the print apparatus 1 in step S1202. Upon receiving the registration response, the print apparatus 1 completes the registration. Consequently, authentication information for identifying the print apparatus 1 is generated in the server 5 and managed in the database 51. From then on, the print apparatus 1 accesses the server 5 using this authentication information. These methods are practiced in ordinary web services, and no particular limitation is intended regarding a registration method and a management method. Therefore, a detailed description thereof is omitted.

In order to change/confirm seller information, the print apparatus 1 transmits a seller information notification request to the server 5 in step S1203. Here, when there is seller information serving as a target of change, this seller information serving as the target of change is included in the seller information notification request of step S1203.

In response to reception of the seller information notification request in step S1203, the server 5 updates the database 51 using the seller information serving as the target of change if the seller information notification request includes such seller information. At the same time as the update, the server 5 transmits a seller information notification response including updated, current seller information to the print apparatus 1 in step S1204. If the seller information notification request of step S1203 does not include the seller information serving as the target of change, the server 5 acquires current seller information by confirming the content of the database 51.

In order to change/confirm seller information again after changing seller information, the print apparatus 1 transmits a seller information notification request to the server 5 in step S1205. In response to reception of the seller information notification request in step S1205, the server 5 transmits a seller information notification response to the print apparatus 1 in step S1206.

As described above, the print apparatus 1 can update seller information stored in the database 51 of the server 5. As a response from the server 5 includes updated seller information, the print apparatus 1 can achieve synchronization between seller information stored in itself and seller information stored in the database 51 of the server 5.

It should be noted that the print apparatus 1 can transmit a seller information notification request as appropriate whenever necessary, e.g., when the power is turned on or off. Seller information may be set or changed via a client apparatus 2 connected to the print apparatus 1 as in the first embodiment, or via an operation panel 15 of the print apparatus 1.

FIG. 13 shows a communication sequence of the browser apparatus 4 and the server 5.

The browser apparatus 4 requests an HTML document of a management dialog of the print apparatus 1 by transmitting an HTTP request to the server 5 in step S1301. In response to reception of the HTTP request in step S1301, the server 5 transmits an HTTP response including the HTML document of the management dialog of the print apparatus 1 to the browser apparatus 4 in step S1302.

Based on a user instruction, the browser apparatus 4 refers to the server 3, which is a link destination indicated by seller information included in this HTML document, and accesses the server 3 by transmitting an HTTP request thereto in step S1303. In response to reception of the HTTP request in step S1303, the server 3 transmits an HTTP response including an HTML document related to a consumable purchase service to the browser apparatus 4 in step S1304. The browser apparatus 4 displays the received HTML document, thereby allowing a user to use the consumable purchase service.

Although FIG. 13 shows a case in which the server 3 providing a consumable purchase service and the server 5 providing a cloud service are configured separately, they may instead be configured integrally.

As described above, in the second embodiment, a cloud service providing apparatus with which the print apparatus 1 is registered can be notified of access information indicating the location of a consumable purchase service providing apparatus, the access information being set by an administrator of the print apparatus 1. In this way, the user can receive a service provided by a seller desired by the administrator without performing a special operation.

Third Embodiment

As indicated above, information related to a consumable purchase service providing apparatus can be set arbitrarily for each print apparatus. Furthermore, all client apparatuses that use a print apparatus can share information related to a consumable purchase service providing apparatus. Therefore, for example, there may be a demand to cause client PCs, client smartphones, and the like provided by a company to connect to and access a consumable purchase site of a server provided by an in-house purchase department. Furthermore, in a case where a plurality of client apparatuses use the same print apparatus, there may be a demand to cause every one of the client apparatuses to connect to a server of a consumable service provider whenever it issues a consumable purchase order. In these cases also, the present embodiment allows the client apparatuses to access a seller desired by an administrator.

Furthermore, there is a case in which a print apparatus is equipped with a web server and a client apparatus equipped with a web browser requests a purchase of consumables via the web server. In this case also, the purchase of consumables can be ordered by the web browser of the client apparatus connecting to a server of a service provider desired by a user via the web server of the print apparatus.

Furthermore, in a case where a print apparatus is registered with a cloud service providing apparatus, information related to a server providing a consumable purchase service can be shared also by a remote apparatus that uses the print apparatus via the cloud service providing apparatus. Furthermore, in a case where a purchase of consumables is requested via a web server of a print apparatus, a client apparatus equipped with a web browser can share information related to a consumable purchase service providing apparatus.

Therefore, for example, once the administrator has set information related to a particular consumable purchase service providing apparatus to a single print apparatus, all of client apparatuses, remote apparatuses, and the like that use the print apparatus can share a seller. At this time, a user can use shared information without paying attention to the information related to the consumable purchase service providing apparatus. This facilitates management of the seller.

The foregoing embodiments have introduced a configuration in which information is shared for the purpose of coordination among a print apparatus, a client apparatus or a browser apparatus that uses the print apparatus, and a server that provides a service related to consumables of the print apparatus; however, the embodiments are not limited in this way. Access information of a server can be updated, changed, and set so as to share information for the purpose of coordination among the plurality of apparatuses in accordance with a service provided by the server. In this case, information related to the server, including the access information, is stored in the non-volatile memory 14 as appropriate in the foregoing embodiments.

Furthermore, although a print apparatus has been described as an example of an apparatus that connects to a server in the foregoing embodiments, no limitation is intended in this regard. For example, the embodiments are applicable also to the following apparatuses that use access information of a server for the purpose of coordination with the server: a multi-functional peripheral that has multiple functions including a scanner function, a FAX function, and the like, and a scanner apparatus or a FAX apparatus that individually has such functions.

In the foregoing embodiments, information for accessing a seller from which consumables are to be purchased (e.g., URL) has been described as an example. However, no limitation is intended in this regard; for example, information for accessing a page containing a product manual of a product may be used instead. For example, assume a case in which a URL of a web page containing a product manual provided by a product manufacturer is registered with an apparatus as default setting. In this case also, for example, there may be a demand to cause access to another page of a site of the manufacturer, or to a manual page provided by a company that uses the apparatus. In this case, the present embodiments make it possible to set an arbitrary access destination such as the apparatus and a server with which the apparatus is registered. This enables a client apparatus to access a web page desired by the administrator.

It should be noted that the functions of the foregoing embodiments can be realized also by the following configuration. Program codes for executing processing of the present embodiments are supplied to a system or an apparatus, and a computer (or CPU or MPU) of the system or the apparatus executes the program codes. In this case, the program codes read from a recording medium realize the functions of the foregoing embodiments by themselves, and the storage medium storing the program codes also realizes the functions of the present embodiments.

Furthermore, the program codes for realizing the functions of the present embodiments may be executed by one computer (CPU, MPU), or may be executed by a plurality of computers operating in coordination. Moreover, the program codes may be executed by a computer, or hardware, e.g., a circuit for realizing the functions of the program codes may be provided. Alternatively, a part of the program codes may be realized by hardware, and the remaining part of the program codes may be executed by a computer.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-150132, filed Jul. 23, 2014, which is hereby incorporated by reference herein in its entirety.

What is claimed is:

1. A print apparatus connectable to a plurality of external devices, the print apparatus comprising:
at least one processor and at least one memory coupled to the at least one processor, the at least one processor serving as units comprising:
a first transmission unit that transmits, to a predetermined external device transmitting a predetermined request among the plurality of external devices, data of a screen in which a first URL indicating a location of a server of a desired seller can be inputted,
wherein the server is different from the plurality of external devices and the print apparatus and provides a purchase service of consumables of the print apparatus, and the first URL is different from a second URL, indicating a location of a server of a default seller, which has been retained as a default in each of the plurality of external devices;
a reception unit that receives the first URL which has been inputted via the screen displayed on the predetermined external device, and receives a request to use the second UR;
a storage unit that stores the first URL in a case where the reception unit receives the first URL;
an updating unit that updates contents stored in the storage unit so that the contents indicate to use the first URL in a case where the reception unit receives the first URL, and updates the contents stored in the storage unit so that the contents indicate to use the second URL in a case where the reception unit receives the request to use the second URL; and
a second transmission unit,
wherein the second transmission unit transmits to another external device among the plurality of external devices, the first URL which is received by the reception unit and is stored in the storage unit, and causes the another external device to access the server of the desired seller using the first URL which is transmitted from the print apparatus by the second transmission unit, in a case where the contents stored in the storage unit indicate to use the first URL, and
wherein in a case where the second URL has not been inputted via the screen displayed on the predetermined external device, the second transmission unit causes the another external device to access the server of the default seller using the second URL which has been retained as the default in the another external device in a case where the contents stored in the storage unit indicate to use the second URL.

2. The apparatus according to claim 1, wherein the at least one processor transmits, to the predetermined external device, information indicating whether the first URL stored in the storage unit has been changed.

3. The apparatus according to claim 2, wherein
the storage unit stores the first URL and a flag indicating whether to use the first URL or the second URL, and
the update unit updates the flag.

4. The apparatus according to claim 3, wherein
in a case where the reception unit receives the first URL, the updating unit updates the flag to use the first URL and updates the stored first URL to the newly received UR, and in a case where the updating unit updates the flag to use the second URL, the updating unit clears the stored first URL.

5. The apparatus according to claim 1, further comprising a registration unit that registers the print apparatus with a second server that manages URLs each indicating a location of a first server used by the predetermined external device,
wherein the storage unit stores the first URL indicating the location of the first server to the second server.

6. The apparatus according to claim 1, wherein the print apparatus has a function of a web server, and
the predetermined external device is equipped with a web browser for accessing the web server.

7. The apparatus according to claim 1, wherein the consumable is ink.

8. The apparatus according to claim 1, further comprising an access unit that accesses the server of the desired seller in accordance with the first URL stored in the storage unit.

9. The apparatus according to claim 1, wherein new URL can be inputted on the screen, and
in a case where the new URL is input via the screen on the predetermined external device, the storage unit stores the input new URL.

10. The apparatus according to claim 1, wherein the second transmission unit transmits, to the another external device, the first URL and data of a second screen in which an instruction can be inputted, the instruction being for accessing the server of the desired seller for receiving the purchase service using the first URL, and
wherein the another external device accesses the server of the desired seller, in accordance with the instruction input via the second screen displayed based on the data of the second screen transmitted by the second transmission unit.

11. The apparatus according to claim 10, wherein the second screen includes display of remaining amounts of the consumables.

12. The apparatus according to claim 10, wherein the second transmission unit transmits the data of the second screen including a display item on which a link destination of the first URL has been set, and
wherein the another external device accesses the server of the desired seller, in accordance with the instruction to the display item.

13. The apparatus according to claim 12, wherein the data of the first screen and the data of the second screen are HTML document.

14. The apparatus according to claim 12, wherein the second transmission unit transmits the data of the second screen to the another external device, in response to the reception of the first URL from the predetermined external device.

15. The apparatus according to claim 10, wherein the second transmission unit transmits the data of the second screen in which an instruction for accessing the server of the desired seller for receiving the purchase service using the first URL can be inputted, in a case where the contents are updated by the updating unit, and
wherein the another external device accesses the server of the desired seller, in accordance with the instruction input via the second screen displayed based on the data of the second screen transmitted by the second transmission unit.

16. The apparatus according to claim 1, wherein the another external device accesses the server of the desired seller using the first URL without displaying the screen.

17. The apparatus according to claim 1, wherein the second transmission unit transmits, to the predetermined external device, the first URL which has been transmitted to the another external device, and the predetermined external device accesses the server of the desired seller using the first URL transmitted by the second transmission unit.

18. The apparatus according to claim 1 wherein the update by the updating unit is to clear the first URL stored in the storage unit.

19. The apparatus according to claim 1, wherein the another external device accesses the server of the default seller using the second URL which has been retained in the another external device, in a case where the second URL has not been inputted via the screen displayed on the predetermined external device.

20. The apparatus according to claim 1, wherein the second transmission unit transmits the first URL of the desired seller to another server different from the server which provides the purchase service of consumables of the print apparatus.

21. The apparatus according to claim 20, wherein an external device among the plurality of external devices accesses the server of the desired seller which provides the purchase service, using the first URL stored in the another server.

22. A method for setting information to a print apparatus connectable to a plurality of external devices, the method comprising:
  a first transmission step of transmitting, to a predetermined external device transmitting a predetermined request among a plurality of external devices, data of a screen in which a first URL indicating a location of a server of a desired seller can be inputted,
  wherein the server is different from the plurality of external devices and the print apparatus and provides a purchase service of consumables of the print apparatus, and the first URL is different from a second URL, indicating a location of a server of a default seller, which has been retained as a default in each of the plurality of external devices;
  a receiving step of receiving, from the predetermined external device transmitting the predetermined request, the first URL which has been inputted via the screen displayed on the predetermined external device transmitting the predetermined request and which is transmitted from the predetermined external device, and receiving a request to use the second URL;
  a storage step of storing in a storage unit the first URL, in a case where the first URL is received;
  an updating step of updating contents stored in the storage unit so that the contents indicate to use the first URL in a case where the first URL is received, and updates the contents stored in the storage unit so that the contents indicate to use the second URL in a case where the request to use the second URL is received; and
  a second transmission step,
  wherein the second transmission step transmits to another external device among the plurality of external devices, the first URL which is received in the receiving and is stored in the storage unit, and
  causes the another external device to access the server of the desired seller using the first URL which is transmitted from the print apparatus in the second transmission step, in a case where the contents stored in the storage unit indicate to use the first URL, and
  wherein in a case where the second URL has not been inputted via the screen displayed on the predetermined external device, the second transmission unit causes the another external device to access the server of the default seller using the second URL which has been retained as the default in the another external device in a case where the contents stored in the storage unit indicate to use the second URL.

23. A non-transitory computer-readable storage medium storing a program for causing a computer to function as:
  a first transmission unit that transmits, to a predetermined external device transmitting a predetermined request among the plurality of external devices, data of a screen in which a first URL indicating a location of a server of a desired seller can be inputted,
  wherein the server is different from the plurality of external devices and the print apparatus and provides a purchase service of consumables of the print apparatus, and the first URL is different from a second URL, indicating a location of a server of a default seller, which has been retained as a default in each of the plurality of external devices;
  a reception unit that receives the first URL which has been inputted via the screen displayed on the predetermined external device, and receives a request to use the second UR;
  a storage unit that stores the first URL in a case where the reception unit receives the first URL;
  an updating unit that updates contents stored in the storage unit so that the contents indicate to use the first URL in a case where the reception unit receives the first URL, and updates the contents stored in the storage unit so that the contents indicate to use the second URL in a case where the reception unit receives the request to use the second URL; and
  a second transmission unit,
  wherein the second transmission unit transmits to another external device among the plurality of external devices, the first URL which is received by the reception unit and is stored in the storage unit, and
  causes the another external device to access the server of the desired seller using the first URL which is transmitted from the print apparatus by the second transmission unit, in a case where the contents stored in the storage unit indicate to use the first URL, and
  wherein in a case where the second URL has not been inputted via the screen displayed on the predetermined external device, the second transmission unit causes the another external device to access the server of the default seller using the second URL which has been retained as the default in the another external device in a case where the contents stored in the storage unit indicate to use the second URL.

24. A non-transitory computer-readable storage medium storing a program for causing a computer to execute a method comprising:
  a first transmission step of transmitting, to a predetermined external device transmitting a predetermined request among a plurality of external devices, data of a screen in which a first URL indicating a location of a server of a desired seller can be inputted,
  wherein the server is different from the plurality of external devices and the print apparatus and provides a purchase service of consumables of the print apparatus, and the first URL is different from a second URL, indicating a location of a server of a default seller, which has been retained as a default in each of the plurality of external devices;

a receiving step of receiving, from the predetermined external device transmitting the predetermined request, the first URL which has been inputted via the screen displayed on the predetermined external device transmitting the predetermined request and which is transmitted from the predetermined external device, and receiving a request to use the second URL;

a storage step of storing in a storage unit the first URL, in a case where the first URL is received;

an updating step of updating contents stored in the storage unit so that the contents indicate to use the first URL in a case where the first URL is received, and updates the contents stored in the storage unit so that the contents indicate to use the second URL in a case where the request to use the second URL is received; and a second transmission step, wherein the second transmission step transmits to another external device among the plurality of external devices, the first URL which is received in the receiving and is stored in the storage unit, and causes the another external device to access the server of the desired seller using the first URL which is transmitted from the print apparatus in the second transmission step, in a case where the contents stored in the storage unit indicate to use the first URL, and wherein in a case where the second URL has not been inputted via the screen displayed on the predetermined external device, the second transmission unit causes the another external device to access the server of the default seller using the second URL which has been retained as the default in the another external device in a case where the contents stored in the storage unit indicate to use the second URL.

* * * * *